UNITED STATES PATENT OFFICE.

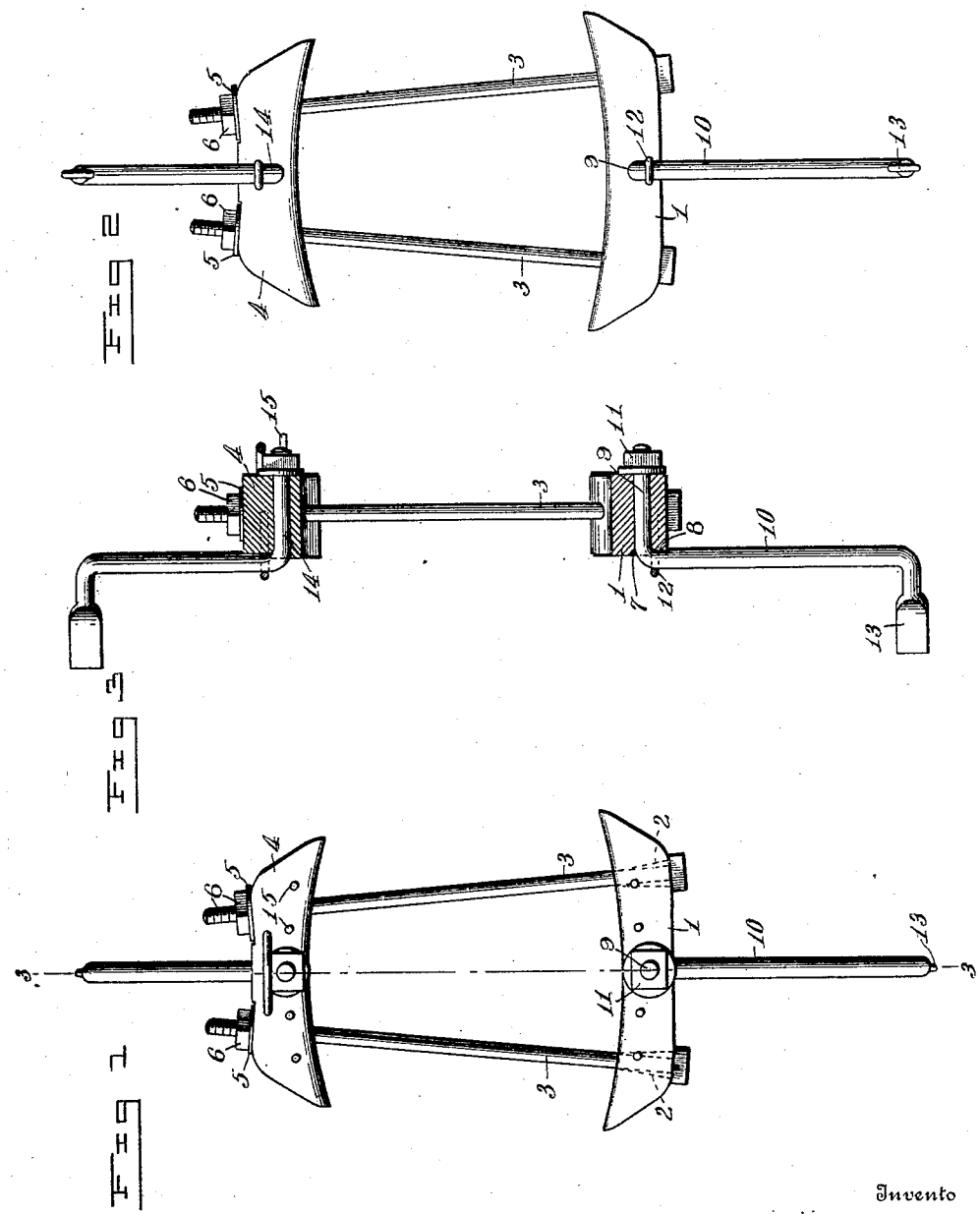

ELIJAH H. ROOK, OF BLACK HAWK, MISSISSIPPI.

CATTLE-YOKE.

No. 915,115.

Specification of Letters Patent.     Patented March 16, 1909.

Application filed March 20, 1908. Serial No. 422,250.

*To all whom it may concern:*

Be it known that I, ELIJAH H. ROOK, a citizen of the United States, residing at Black Hawk, in the county of Carroll and State of Mississippi, have invented certain new and useful Improvements in Cattle-Yokes, of which the following is a specification.

My invention relates to an improved live stock yoke, and it consists in the constructions, combinations and arrangements herein described and claimed.

The object of my invention is to provide a strong and durable form of yoke capable of being quickly and conveniently positioned and removed, and which will efficiently prevent the passage of live stock through wire fences, and also eliminate danger of injury to said fences.

In the accompanying drawings, forming a part of this application and in which similar reference symbols indicate corresponding parts in the several views—Figure 1 is a front elevation, illustrating one embodiment of my invention; Fig. 2 is a rear elevation of the construction shown in Fig. 1; and Fig. 3 is a sectional view on the line 3—3 of Fig. 1.

Referring to the drawings, 1 indicates a lower member provided with enlarged apertures 2 through which loosely extend the side rods 3. The side rods 3 are shown converging from the lower member, and extending through apertures in an upper member 4 of somewhat less width than the member 1. The member 4 is slidably mounted on the side rods, which latter carry washers 5 and nuts 6 for securing said member in its adjusted positions.

The lower member 1 is provided with an aperture 7 and with a recess 8 extending from said aperture in the front face of the member. A guide bar 9 extends through the aperture 7 and is provided with a downwardly turned portion 10 for engaging the recess 8; the free end of said bar being formed with a forwardly extending hook portion 13. A nut 11 is threaded on the rear end of the guide bar for clamping it in position, and a staple 12 extends across the downwardly extending portion 10 of said bar for securely seating it in the recess 8 and preventing accidental turning of said bar.

The upper member 4 is provided with a corresponding guard bar 14, which is similarly secured in position.

The rear faces of the upper and lower members are provided with pins, or small rods, 15, which will be pressed into the neck of an animal upon engagement of the guard bars with an obstruction, such as the wires of a fence.

From the above description, it will be understood that my invention provides an improved yoke which will be securely held from accidental turning on the neck of an animal, and which will efficiently prevent escape of live stock through a wire fence.

I have illustrated a yoke especially adapted for use with hogs, in which the lower guard bar is preferably formed of greater length than the upper bar, but the yoke is applicable to all live stock and changes could be made within the spirit and scope of my invention.

Having thus described my invention, what I claim as new therein and desire to secure by Letters Patent is:—

1. A yoke comprising upper and lower members, side rods adjustably connecting said members, guard bars extending from the front faces of said members, and forwardly extending hook portions on the ends of said guard bars, substantially as described.

2. A yoke comprising upper and lower members provided with apertures and recesses in their front faces, guard bars extending through said apertures and seated in said recesses, means for securing said guard bars in place, and forwardly extending hook portions on the ends of said bars, substantially as described.

3. A yoke comprising a lower member, side rods loosely mounted in said member and converging therefrom, an upper member adjustably mounted on said rods, guard bars extending from the front faces of said members, and forwardly extending hook portions on the ends of said guard bars, substantially as described.

4. A yoke comprising upper and lower members provided with apertures and recesses in their front faces, guard bars extending through said apertures and seated in said recesses, securing nuts threaded on the rear ends of said guard bars, staples extending across said guard bars for securing them in the recesses in said members, forwardly extending hook portions on the ends of said bars, and pins extending from the rear faces of said members, substantially as described.

In testimony whereof I affix my signature in presence of two witnesses.

ELIJAH H. ROOK.

Witnesses:
J. B. STREATER,
B. J. MARSHALL.